United States Patent [19]

Roe

[11] 4,171,109
[45] Oct. 16, 1979

[54] TAPE MEASURE CASING
[75] Inventor: Alfred W. Roe, Bellport, N.Y.
[73] Assignee: Roe International, Inc., Patchogue, N.Y.
[21] Appl. No.: 899,781
[22] Filed: Apr. 25, 1978
[51] Int. Cl.² .......................... B65H 75/48; G01B 3/10
[52] U.S. Cl. ...................................... 242/107; 33/138; 267/156
[58] Field of Search ............................ 242/107-107.7, 242/84.8; 33/138; 185/45; 267/59, 62, 156

[56] References Cited
U.S. PATENT DOCUMENTS

| | | | |
|---|---|---|---|
| 982,444 | 1/1911 | Smith | 267/156 X |
| 1,320,767 | 11/1919 | Komorous | 242/107 |
| 2,549,098 | 4/1951 | Joseph | 242/107.2 |
| 3,049,317 | 8/1962 | Kessler | 242/107 X |

Primary Examiner—Harvey C. Hornsby
Assistant Examiner—John M. Jillions
Attorney, Agent, or Firm—Harold L. Stults; Pasquale A. Razzano

[57] ABSTRACT

A casing for a retractable type tape measure includes a coil spring secured to the rule of the tape measure. The casing has an outer shell and a central interior mounting structure for attachment to the inner end of the coil spring. The mounting structure comprises a specially constructed guide post for guiding the inner end of the coil spring in a smooth relatively large radius curve about the mounting structure to the first inner turn of the coil spring, thereby to avoid sharp bends in the spring and permit the use of unannealed spring steel to form the spring.

13 Claims, 7 Drawing Figures

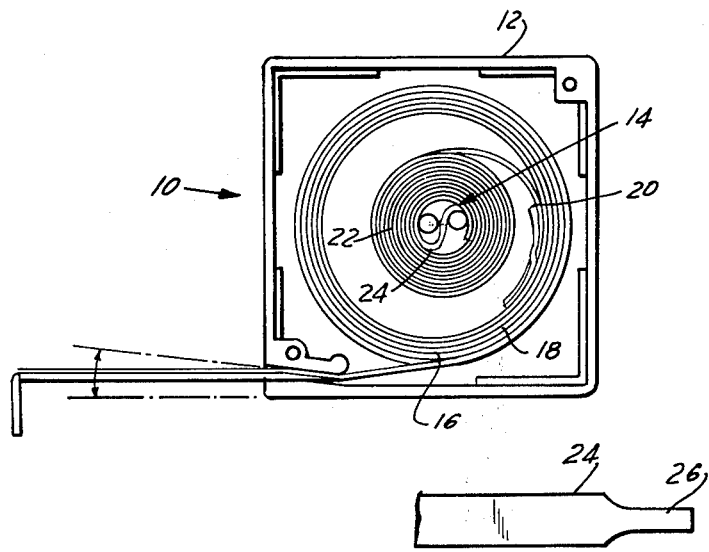
FIG. 1
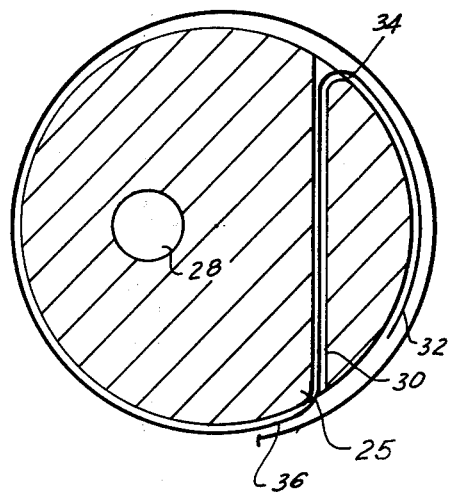
FIG. 2
PRIOR ART
FIG. 1a
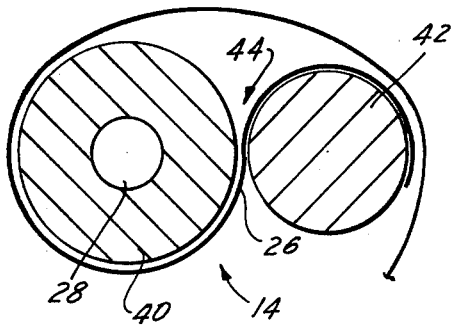
FIG. 3
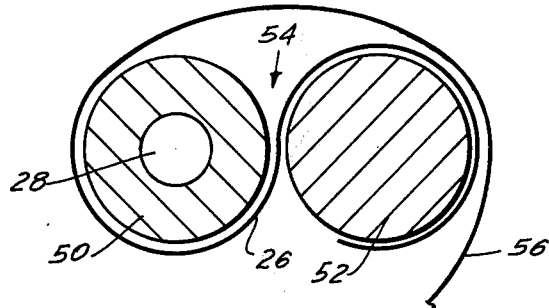
FIG. 4
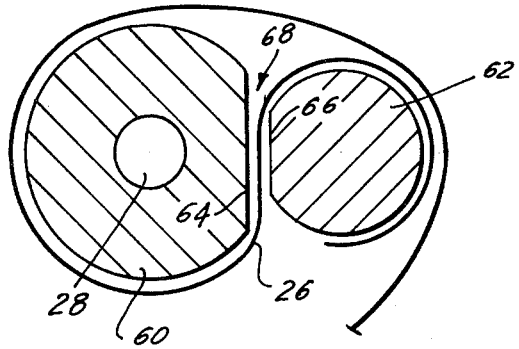
FIG. 5
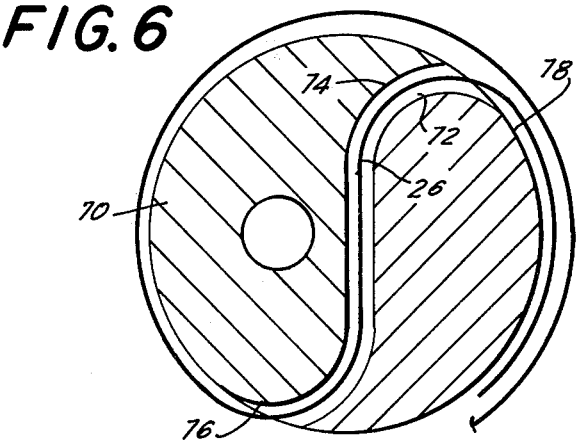
FIG. 6

TAPE MEASURE CASING

The present invention relates to tape measures, and in particular to a tape measure casing structure.

In the manufacture of tape measure rules, the tape measure usually includes a casing in which a flexible rule is wound whose inner end is connected to a spring which is, in turn, coiled about itself. The inner end of the spring is typically secured to a mounting post which has a straight slot formed therein that receives the inner end of the spring. In order to assure that the spring is secured in the slot, a short length of the spring must extend beyond the slot. This requires that the end of the spring be bent at an obtuse angle about the post where it extends from the slot. Because of the sharp bend required to be made in the spring, the spring, if not annealed, will break. Therefore, it is a requirement in previously proposed tape measures that the coil spring used to retract the rule be annealed. The annealing process is relatively expensive and takes a substantial amount of time, thus reducing the speed a which the entire tape measure assembly can be manufactured. The annealing process also introduces a number of variables into the manufacturing procedure, since too much time or too much heat in the annealing procedure, or too much heat over too large or too small an area, can cause variations and breakages in the spring. Batch annealing on the other hand is not satisfactory since some springs are overheated while some may be underheated, so that there is always a variation in the length of spring that is annealed. This produces variations in the action of the tape measures produced by the manufacturer.

It is an object of the present invention to provide a casing structure for a tape measure which will permit the use of unannealed spring steel to form the coil spring of the tape measure.

Another object of the present invention is to provide a tape measure casing which will permit the speed at which tape measures can be manufactured and assembled to be substantially increased.

A further object of the present invention is to produce an improved casing structure for a tape measure which is economical to manufacture and durable in use.

In accordance with an aspect of the present invention a tape measure is provided which includes a casing, a flexible tape rule wound in the casing in a coil, and a coil spring formed of unannealed spring steel. The spring has a first end secured to the rule and a second end secured to the casing. The casing includes a central interior mounting structure which is engaged with the second or inner end of the coil spring. The mounting structure comprises a guide post arrangement for guiding the inner end of the spring in a smooth relatively large radius curve about the mounting structure to the first inner turn of the coil spring thereby to avoid sharp bends in the spring steel. This structure permits a spring steel which is unannealed to be used, thereby eliminating the annealing process from the manufacturing procedure. Elimination of this annealing process makes for greater uniformity in the action of the tape measures produced by the manufacturer and increases the speed at which the tape measures can be assembled. By using unannealed spring steel to form the coil springs, a manufacturer can now use large unbroken coils of steel to form the springs, and can even use scrap steel, which typically comes in smaller rolls which are not adaptable to automation processes when annealing is required.

The above, and other objects, features and advantages of this invention will be apparent in the following detailed description of an illustrative embodiment thereof, which is to be read in connection with the accompanying drawings, wherein:

FIG. 1 is a side sectional view of a tape measure having a mounting post structure constructed in accordance with the present invention;

FIG. 1A is a plan view of the inner end of a typical coil spring;

FIG. 2 is an enlarged plan view of a typical prior art mounting post structure;

FIG. 3 is an enlarged view of a mounting post structure constructed in accordance with the present invention; and FIGS. 4–6 are enlarged plan views, similar to FIG. 3, of other embodiments of the invention.

Referring now to the drawings in detail, and initially to FIG. 1, a tape measure 10 constructed in accordance with the present invention includes a casing 12, which is preferably formed of molded plastic or the like in two mating halves. One of the halves, illustrated in FIG. 1, has a central mounting post structure 14, constructed in accordance with the present invention, while the other half is substantially identical to the half 12, but does not include post structure 14. The tape measure includes a coiled rule 16, of conventional construction, typically formed of a flexible metal, such as steel or the like. The inner end 18 of the tape rule is connected in any convenient manner to the outer end 20 of a coiled spring 22. The inner end 24 of the coiled spring is secured to post structure 14, as described hereinafter. In accordance with the present invention, the coiled spring is formed of unannealed spring steel.

As seen in FIG. 1A, the inner end 24 of the spring is cut to form a tapered tongue 26 or the like, which is engaged with post structure 14. In conventional prior art tape measures, this inner end is annealed, in order to increase its bending strength. The annealing procedure is required in prior art arrangements because of the post mounting structure which has previously been proposed.

The typical prior art mounting structure is shown in FIG. 2. As seen therein, a cylindrical post 25 is typically provided, located slightly off center in the casing, and having an opening 28 formed therein (at the center of the casing) which is adapted to receive a screw or the like that extends between the casing halves, to secure the halves together. The post structure typically has a diameter of 0.250 inches, and has a straight slot 30 formed therein. This slot receives the tapered end 26 of spring 22 to secure the spring to the casing. In order to insure that the spring is secured in the slot and remains in position, the extreme free end 32 of spring end 26 is bent at an obtuse angle 34, about the post structure. Because of the requirement for this bend in the steel, the steel must be annealed to insure that the end does not break off. A similar bend is provided at the outer end portion 36 of the spring end 26, but it is not as sharp an angle as at 34. As mentioned above, it is an object of the present invention to avoid such sharp bends in the end of the spring steel, in order to permit the use of unannealed spring steel in forming the coil spring 22.

In the embodiment of the invention illustrated in FIGS. 1 and 3, this is accomplished by a post structure 14 which in fact consists of two cylindrical post elements 40, 42. The post 40 preferably has a diameter of 0.150 inches; post 42 has a diameter of 0.10 inches. Post 40 also has an opening 28 formed therein to receive the casing connecting bolt or screw. The posts are slightly spaced from one another to define a space or slot 44 therebetween in which the end 26 of the spring is positioned. The extreme end portion 32 of the spring is bent about the post 42, but its curvature is not sharp; rather it conforms to and is guided by the outer peripheral surface of post 42. Likewise, the remainder of the spring is guided about post 40. This arrangement firmly holds the spring on the post to insure against disengagement thereof, but holds the sharp bends of the prior art arrangements.

In a typical spring steel, such as is used in manufacturing tape measures, the steel has a hardness range of Rockwell C45-48. With unannealed spring steel of that hardness, the bend provided by a post having a 1/10 of an inch diameter does not cause the steel to break. In fact, it has been found that with steels of this hardness, and even hardnesses of as great as Rockwell C56, a post diameter of 0.09 inch diameter would be satisfactory; but it is believed that 1/10 of an inch is a safe minimum diameter for the curvature of the post. With this post arrangement, the unannealed spring will take a set, since it is bent beyond its elastic limits, but it is not bent beyond the critical point at which a fracture will occur.

In another embodiment of the invention illustrated in FIG. 4, two posts 50, 52 are provided of substantially the same diameter, preferably 0.125 inches. The post 50 has the bolt or screw receiving opening 28 formed therein, and the two posts define a gap or slot 54 therebetween in which the end 26 of the spring is received. Again, the end 26 of the spring is guided about the periphery of the post structure to the first inner turn 56 of the coil spring, but in a curvature which is insufficient to cause the unannealed spring to break.

Yet another embodiment of the invention is illustrated in FIG. 5, wherein again two posts of unequal diameter are provided. In this case, a large post 60 having a diameter of about 0.150 inches and a smaller post 62 having a diameter of about 0.10 inches. The larger post 60 has the screw opening 28 formed therein, and each post has a flat cord section 64, 66, respectively facing each other in slightly spaced relationship, to define a slot 68 therebetween which receives the end 26 of the spring 22. Again with this arrangement, the peripheral sides of the post guide the spring in a smooth curve of a sufficiently large diameter to enable the spring to take a "set" but which avoids the creation of any sharp bends in the spring.

Yet another embodiemnt of the invention is illustrated in FIG. 6, wherein a single large post 70 is provided having a diameter of 0.250 inches. In this embodiment of the invention the post has a generally S-shaped slot 72 formed therein with curved end portions 74, 76 respectively. These curved end portions are generally semi-circular in shape, and have a diameter of about 0.10 inches, with the ends of the curves adjacent the peripheral wall 78 of the post exiting the post substantially tangentially to the periphery thereof. By this arrangement again the end 26 of the tape is guided by the walls of the slot and the post in smooth curves of sufficiently large diameter to prevent breakage of the unannealed coiled spring, but of sufficient size to enable the spring to take a set and insure that the spring will be tightly held on the post during operation of the tape measure.

Although an illustrative embodiment of the present invention has been described herein with reference to the accompanying drawings, it is to be understood that the invention is not limited to that precise embodiment, and that various changes and modifications may be effected therein by one skilled in the art without departing from the scope or spirit of this invention.

What is claimed is:

1. A tape measure casing for a retractable tape measure including a coil spring secured to the tape measure, said casing comprising an outer shell and a central interior mounting structure for attachment to the inner end of said coil spring, said mounting structure comprising a cylindrical post centrally located in said casing and having a generally S-shaped slot formed therein along its central axis receiving the inner end of the spring, said slot defining walls in said post which provide guiding means for guiding said inner end of the coil spring in a smooth relatively large radius curve about the mounting structure to the first inner turn of the coil spring thereby to avoid sharp bends in the spring and permit the use of unannealed spring steel to form said spring.

2. A tape measure casing as defined in claim 1 wherein the ends of said S-shaped slot emerge from the post generally tangentially to the periphery of the post.

3. A tape measure casing for a retractable tape measure including a coil spring secured to the tape measure, said casing comprising an outer shell and a central interior mounting structure for attachment to the inner end of said coil spring, said mounting structure comprising a pair of closely spaced parallely extending cylindrical posts centrally located in said casing and defining a slot therebetween receiving said inner end of the spring, the walls of said posts defining guiding means for guiding said inner end of the coil spring in a smooth relatively large radius curve about the mounting structure to the first inner turn of the coil spring thereby to avoid sharp bends in the spring.

4. A tape measure casing as defined in claim 3 wherein said posts have substantially equal diameters.

5. A tape measure casing as defined in claim 4 wherein said posts have different diameters.

6. A tape measure casing as defined in claim 5 wherein the diameter of the smaller of said posts is not less than one tenth of an inch.

7. A tape measure casing as defined in claim 5 wherein said posts have flat peripheral chord sections formed thereon facing each other and defining said slot therebetween.

8. A tape measure comprising a casing, a flexible tape rule wound in said casing in a coil, and a coil spring formed of unannealed spring steel, said spring having a first end secured to said rule and a second, inner end secured to the casing; said casing including a central interior mounting structure engaged with said second end of the coil spring; said mounting structure comprising a cylindrical post centrally located in said casing and having a generally S-shaped slot formed therein along its central axis receiving the inner end of the spring, said slot defining walls in said post which define guiding means for guiding said inner end of the spring in a smooth relatively large radius curve about the mounting structure to the first inner turn of the coil spring thereby to avoid sharp bends in the spring with the ends of said S-shaped slot emerging from the post generally tangentially to the periphery of the post.

9. A tape measure comprising a casing, a flexible tape rule wound in said casing in a coil, and a coil spring formed of unannealed spring steel, said spring having a first end secured to said rule and a second, inner end secured to the casing; said casing including a central interior mounting structure engaged with said second end of the coil spring; said mounting structure comprising a pair of closely spaced parallely extending cylindrical posts centrally located in said casing and defining a slot therebetween receiving said inner end of the spring, the walls of said post defining guiding means for guiding said inner end of the spring in a smooth relatively large radius curve about the mounting structure to the first inner turn of the coil spring thereby to avoid sharp bends in the spring.

10. A tape measure as defined in claim 9 wherein said posts have substantially equal diameters.

11. A tape measure as defined in claim 10 wherein said posts have different diameters.

12. A tape measure as defined in claim 11 wherein the diameter of the smaller of said posts is not less than one tenth of an inch.

13. A tape measure as defined in claim 11 wherein said posts have flat peripheral chord sections formed thereon facing each other and defining said slot therebetween.

* * * * *